(12) United States Patent
Shumsky et al.

(10) Patent No.: US 11,606,631 B2
(45) Date of Patent: Mar. 14, 2023

(54) PORTABLE HARDWARE-SOFTWARE COMPLEX FOR PATTERN AND FINGERPRINT RECOGNITION

(71) Applicant: Regula Ltd., Minsk (BY)

(72) Inventors: Ivan Shumsky, Minsk (BY); Ihar Kliashchou, Minsk (BY); Yury Rahazhynski, Minsk (BY)

(73) Assignee: Regula Ltd., Minsk (BY)

( * ) Notice: Subject to any disclaimer, the term of this patent is extended or adjusted under 35 U.S.C. 154(b) by 207 days.

(21) Appl. No.: 17/134,243

(22) Filed: Dec. 25, 2020

(65) Prior Publication Data
US 2021/0203812 A1  Jul. 1, 2021

(30) Foreign Application Priority Data

Dec. 27, 2019 (BY) .................................. u20190321

(51) Int. Cl.
| | | |
|---|---|---|
| *H04N 23/56* | (2023.01) | |
| *G06F 21/32* | (2013.01) | |
| *H04N 1/32* | (2006.01) | |
| *H04N 5/33* | (2023.01) | |
| *H04N 23/45* | (2023.01) | |
| *H04N 23/11* | (2023.01) | |
| *H04N 23/13* | (2023.01) | |
| *H04N 23/51* | (2023.01) | |

(Continued)

(52) U.S. Cl.
CPC ............. *H04N 23/56* (2023.01); *G06F 21/32* (2013.01); *G06V 40/1318* (2022.01); *H04N 1/32138* (2013.01); *H04N 5/33* (2013.01); *H04N 23/11* (2023.01); *H04N 23/13* (2023.01); *H04N 23/45* (2023.01); *H04N 23/51* (2023.01); *G06T 5/006* (2013.01); *H04N 5/213* (2013.01); *H04N 25/63* (2023.01)

(58) Field of Classification Search
None
See application file for complete search history.

(56) References Cited

U.S. PATENT DOCUMENTS 5,920,061 A * 7/1999 Feng .................. G06K 7/10722
235/472.01
2003/0099379 A1* 5/2003 Monk ..................... G06V 30/40
382/218

(Continued)

FOREIGN PATENT DOCUMENTS

RU           2696898 C9   8/2019

*Primary Examiner* — Quan Pham
(74) *Attorney, Agent, or Firm* — Bardmesser Law Group

(57) ABSTRACT

The invention relates to devices intended for reading and recognizing printed or written characters or for recognizing patterns, e.g., fingerprints, for document verification/authentication (e.g., passport verification). A portable hardware-software complex (PHSC) includes a housing with a visible spectrum camera and a fingerprint scanner. The housing includes a power supply unit and a processor. On the housing from the fingerprint scanner side there is a display, and on the back side of the housing there is a visible spectrum camera with two or more sources of visible spectrum radiation and UV radiation, installed to illuminate the visible spectrum camera field of view. On the back side of the body there is an infrared camera and one or more sources of infrared radiation, for illuminating the field of view of the infrared camera.

12 Claims, 2 Drawing Sheets

(51) Int. Cl.
*G06V 40/13* (2022.01)
*H04N 5/213* (2006.01)
*G06T 5/00* (2006.01)
*H04N 25/63* (2023.01)

(56) References Cited

U.S. PATENT DOCUMENTS

| | | | | |
|---|---|---|---|---|
| 2006/0018508 A1* | 1/2006 | Monk | ............... | G07D 7/128 |
| | | | | 382/100 |
| 2007/0234066 A1* | 10/2007 | Dufour | ............... | G06F 21/32 |
| | | | | 713/186 |
| 2012/0013734 A1* | 1/2012 | Ranieri | ............... | G01J 3/50 |
| | | | | 348/125 |
| 2012/0075442 A1* | 3/2012 | Vujic | ............... | G07C 9/257 |
| | | | | 235/472.01 |
| 2015/0341370 A1* | 11/2015 | Khan | ............... | H04L 63/20 |
| | | | | 726/30 |
| 2016/0247341 A1* | 8/2016 | Talwerdi | ............... | B42D 9/04 |

* cited by examiner

PORTABLE HARDWARE-SOFTWARE COMPLEX FOR PATTERN AND FINGERPRINT RECOGNITION

CROSS-REFERENCE TO RELATED APPLICATIONS

This application claims priority to Belarus Patent Application No. u 20190321, filed on Dec. 27, 2019, which is incorporated herein by reference in its entirety.

BACKGROUND OF THE INVENTION

Field of the Invention

This invention relates to a class of devices intended for reading and recognizing printed or written characters or for recognizing patterns, e.g., fingerprints.

Background of the Related Art

Many modern documents have several degrees of protection, and use a record of identification data in the form of pictures, symbols, inscriptions, including the application on the surface of the protected product named identification data, where it is necessary to register the biometric information of the document holder.

There is known an automatic pass module (APM) that includes a document scanner, a device for identification in the form of a photo/video camera, a fingerprint scanner, wherein all devices are connected to the control system of APM, which is configured to communicate with external information systems and with a remote operator. APM is configured to scan an identification document, obtain and analyze data, then scanning of fingerprints and making comparisons and further decision. See [1].

This device allows automatic authenticity verification of the document and the indicated data by internal databases and/or using external databases and compare with biometric information of the document holder. However, the device has fairly sizable dimensions and can only function as a part of the set, for example, with a personal computer. The device cannot be used autonomously.

The drawbacks of stationary use are eliminated in the device with fingerprint identification for protection against unauthorized access, configured as a portable transmitting unit containing a means for reading a fingerprint designed, for example, as a scanner, a means for converting a digital image signal into an optical signal, and a stationary receiving unit containing a means for receiving and converting an optical signal into digital, a means for processing the signal and identifying a fingerprint and a lock blocking device, herewith the portable transmitting unit is optically connected to the stationary receiving unit via an optical channel, see [2].

The drawback of this portable device is its limited functionality. The device only scans a fingerprint and compares it with an existing database. The device does not allow recognition and comparison of document data with biometric information of the document holder. It is not possible to operate autonomously without a stationary receiving unit.

Accordingly, there is a need in the art for a portable solution to the problems identified above.

SUMMARY OF THE INVENTION

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

An object of the invention is to create a compact device with the possibility of autonomous recognition and reading of document security features in white, UV, IR light spectrum and their automatic processing without direct contact of the document with the device. A possibility of automatic comparison of recognized document data with biometric information of the document holder is also provided.

To achieve this object, a portable hardware-software complex (PHSC) comprising a body (housing) with a digital camera and a fingerprint scanner is provided. The body (housing) of the PHSC contains a power supply unit and a processor. On the housing from the fingerprint scanner side, there is a display, and on the back side of the body there is a digital camera with two or more sources of white light and UV radiation, installed with the possibility to illuminate the document in the digital camera's field of view. On the back side of the body there is an infrared digital camera and one or more sources of infrared radiation, which can illuminate the document in the field of view of the infrared digital camera.

Analysis of visible, IR and UV images received from both cameras via sources of white light, IR and UV radiation allows detecting most of the commonly used document security features and verifying document authenticity. That, together with the fingerprint scanner and RFID reader enables to verify the document holder and the document authenticity automatically to the full extent.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention.

DETAILED DESCRIPTION OF EMBODIMENTS OF THE INVENTION

Figure 1:
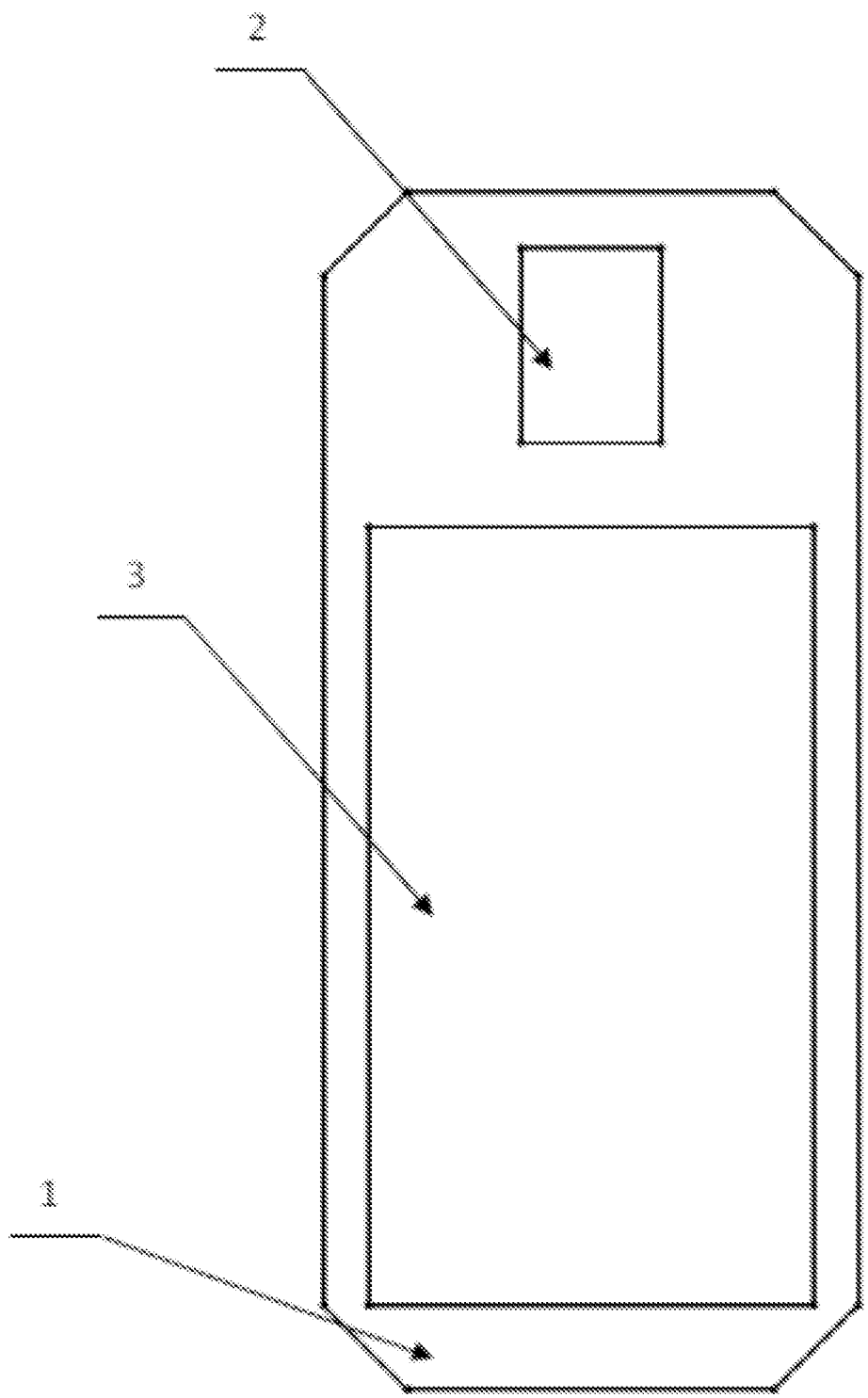
FIG. 1 shows the PHSC view from the fingerprint scanner side.

Reference will now be made in detail to the preferred embodiments of the present invention, examples of which are illustrated in the accompanying drawings.

In one exemplary embodiment, a portable hardware-software complex (PHSC) includes a body (housing) with a digital camera and a fingerprint scanner. The body (housing) of the PHSC contains a power supply unit and a processor. On the housing from the fingerprint scanner side, there is a display, and on the back side of the body there is a digital camera with two or more sources of white light and UV radiation, installed so as to illuminate the digital camera field of view. On the back side of the body there is an infrared digital camera and one or more sources of infrared radiation, which can illuminate the field of view of the infrared digital camera.

Using the IR digital camera, the visible range digital camera, sources of white, IR and UV light, images that allow verifying document (e.g., passport or other documents with built in security measures) authenticity by evaluation of image parameters (reflectance, luminosity, dimensions, etc.) and/or comparison with a reference image(s) of the security features from the image database on the device or server, can be captured. The fingerprint scanner of the device enables a comparison of the fingerprint of the document holder with biometric data from databases and from the RFID chip of the document, thereby accurately identifying the document holder, which together provide a high probability of document authentication and document holder verification.

A special case of the device design is a portable hardware-software complex (PHSC) comprising at least two sources of white light installed at least 1.25 cm (0.5 inch) apart on both sides of the digital camera, whereby each of them can fully illuminate the document. Further processing of the received images, when the document is illuminated by alternately switched on light sources from the pair, enables to eliminate glare on the received document image in the given spectrum range by subtracting image areas outside the dynamic range of the digital cameras.

A special case of the device design is a PHSC, comprising at least two sources of IR light, installed at least 1.25 cm (0.5 inch) apart on both sides of the digital camera, whereby each of the light sources can fully illuminate the document. Further processing of the received images, when the document is illuminated by the alternately switched on light sources from the pair of light sources, enables eliminating glare on the received document image in the given spectrum range by subtracting image areas outside the dynamic range of the digital cameras.

The PHSC may be configured to connect to other devices via a wireless connection system, such as Bluetooth. This provides wireless connection of the complex with databases on remote or local computers.

The PHSC may have a contactless radio frequency identification (RFID) reader. Placing the reader in PHSC makes it possible to read existing RFID chips in documents.

Figure 2:
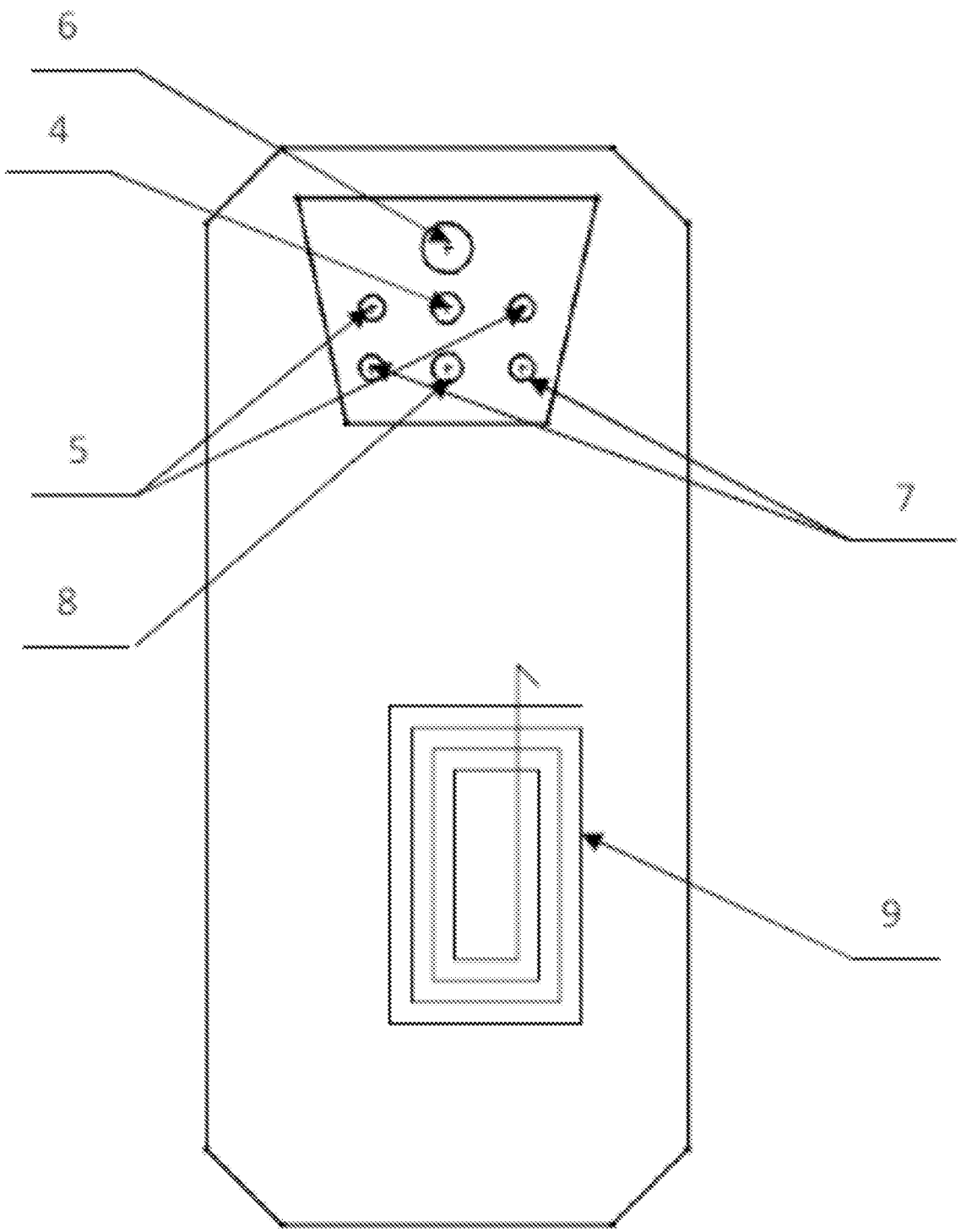
FIG. 2 shows the PHSC view from the back side of the body.

The concept of the invention can be seen more completely by attached drawings, where FIG. 1 shows PHSC view from the fingerprint scanner side, FIG. 2 shows PHSC view from the back side of the housing.

The PHSC is constructed in the housing 1, wherein on the fingerprint scanner side 2 there is a display 3 (FIG. 1). On the back side of the body, there is a digital camera 4 with white light sources 5 and a UV radiation source 6. The apertures of the two white light sources 5 overlap each other, making it possible to fully illuminate the rectangular document. The IR digital camera 8 (FIG. 2) is installed between the sources of IR radiation 7. The apertures of the IR radiation sources 7 also overlap each other. The housing 1 comprises a power supply unit, a processor. On the back side (FIG. 2) inside the housing, there is a radio frequency identification (RFID) reader antenna 9, and Bluetooth and WIFI wireless communication modules (not shown in the drawings).

The software of the PHSC submits a command to the processor and the document is sequentially illuminated in visible and UV spectrum range, the result is recorded by the digital camera 4. The IR image is illuminated by the IR light source 7 and recorded by the IR digital camera 8. The recorded images are submitted to the software for further processing (such as, for example, correction of perspective distortion, elimination of glare) and optical character recognition. The software compares the images with a reference database and examines, by comparing with a reference image, the correct operation of the document elements visible to the naked eye in the visible spectrum light in IR and UV spectrum, which increases the possibility of document authentication and allows for process automation.

The software turns on the radio frequency identification reader via the processor and reads the RFID chip of the document in conformity with the procedure defined in the ICAO standards. The data from the chip is compared to the data recognized from the images. The display shows information about the received data and document authenticity in the required form or the information is transmitted to other devices.

Then fingerprint scanning of the user's fingerprint(s) is carried out. The image of the fingerprint(s) of the document holder and biometric information (e.g., height, weight, eye color, facial structure, body type, palm print, retinal scan, DNA, as well as name, address, etc.) from database(s), as well as the image and data read from the RFID chip of the document, are compared in the device software using known algorithms. As various options, the database(s) may be local (on the device itself, for example, a border control officer checking passport data using only the local database), or the database may be on a server, or as another option, the processing and the database is local, while the result of the processing is sent to the server. The results of the comparison are shown on the display. The data of the comparison results can be wirelessly transmitted to the server or other device(s).

The PHSC has fully automatized document authentication, control of protective IR and UV images, and has demonstrated its performance in daylight and artificial lighting. It enables comparison of the document with biometric data of the document holder. The device can be serially produced on known industrial equipment.

Having thus described a preferred embodiment, it should be apparent to those skilled in the art that certain advantages of the described method and apparatus have been achieved. It enables comparison of the document data with biometric data of the document holder.

It should also be appreciated that various modifications, adaptations and alternative embodiments thereof may be made within the scope and spirit of the present invention. The invention is further defined by the following claims. The entire disclosures of all patents and publications cited above are hereby incorporated by reference.

REFERENCES (INCORPORATED HEREIN BY REFERENCE IN THEIR ENTIRETY)

1. Patent RU 2696898.
2. Patent RU 24230.

What is claimed is:

1. A portable hardware software complex for document verification, comprising:

a housing including a fingerprint scanner;
a power supply within the housing;
a processor within the housing;
a display positioned on a front side of the housing where the fingerprint scanner is located;
a visible spectrum camera on a back side of the housing;
a first visible spectrum source on the back side of the housing;
a second visible spectrum source on the back side of the housing, the first and second visible spectrum sources positioned on opposite sides of the visible spectrum camera and at least 1.25 cm apart from each other;
a source of ultraviolet radiation on the back side of the housing;
wherein the visible spectrum sources and the source of ultraviolet radiation illuminate a field of view of the visible spectrum camera;
an infrared camera on the back side of the housing; and
a first source of infrared radiation on the back side of the housing that illuminates a field of view of the infrared camera;
a second source of infrared radiation on the back side of the housing that illuminates a field of view of the infrared camera, the first and second sources of infrared radiation positioned on opposite sides of the infrared spectrum camera and at least 1.25 cm apart from each other,
wherein the source of ultraviolet radiation is positioned above the first and second sources of infrared radiation and above the infrared camera, and
wherein the processor is configured to capture a first image of a document using the visible spectrum camera when the document is illuminated using the first or second visible spectrum sources;
wherein the processor then captures a second image of the document using the visible spectrum camera and illumination from the source of ultraviolet radiation;
wherein the processor then captures a third image of the document using the infrared camera and illumination from the first or second sources of infrared radiation;
wherein the processor identifies text on the document and protective elements in the document;
wherein the processor verifies the protective elements against corresponding information stored in a database;
wherein the processor verifies the text against corresponding text information in the database;
wherein the processor uses the fingerprint scanner to capture a fingerprint of a person and verifies identity of the person and whether the identity matches the text and the protective elements; and
wherein the processor displays the verification on the display.

2. The complex of claim 1, wherein the protective elements in the document are luminescent in a visible spectrum when exposed to ultraviolet radiation.

3. The complex of claim 1, further comprising at least one additional source of infrared radiation, wherein both sources are used to eliminate glare when capturing the third image.

4. The complex of claim 3, wherein the sources of infrared radiation are turned on sequentially so as to eliminate the glare in the third image.

5. The complex of claim 3, wherein the visible spectrum sources are turned on sequentially so as to eliminate the glare in the first image.

6. The complex of claim 1, wherein the text is identified using the first image.

7. The complex of claim 1, wherein the database is located on the complex.

8. The complex of claim 1, wherein the database is located on a server.

9. The complex of claim 8, wherein the complex is connected to the server via a wireless network.

10. The complex of claim 1, further comprising an RFID (Radio Frequency Identification) reader in the housing, and wherein data from an RF (Radio Frequency) chip in the document is received via the RFID reader and the data from the RF chip is compared with the text.

11. The complex of claim 10, wherein the fingerprint from the fingerprint scanner is compared with a fingerprint read from the RF chip for document verification.

12. A portable hardware software complex for passport verification, comprising:
a housing including a fingerprint scanner on a front side, and a processor inside the housing;
a display on the front side;
a first camera, a first white light source and a UV (ultraviolet) source on a back side of the housing, a second white light source, the first and second white light sources positioned on opposite sides of the first camera and at least 1.25 cm apart from each other, and wherein the white light sources and the UV source all illuminate a field of view of the first camera from different angles;
a second camera, a first IR (infrared) source on the back side of the housing, and a second IR source on the back side of the housing, wherein the first and second IR sources at least 1.25 cm apart from each other, and wherein the IR sources illuminates a field of view of the second camera,
wherein the UV source is positioned above the first and second IR sources and above the second camera;
wherein the first camera captures a first image of a document when the document is illuminated using one or both of the white light sources;
wherein the first camera captures a second image of the document when the document is illuminated using the UV source;
wherein the second camera captures a third image of the document when the document is illuminated using the first and/or second IR source;
wherein the processor identifies text on the document and protective elements in the document using the first, second and third images;
wherein the processor verifies the protective elements against corresponding information stored in a database;
wherein the processor verifies the text against corresponding text information in the database;
wherein the fingerprint scanner captures a fingerprint of a passport holder and verifies identity of the passport holder and whether the identity matches the text and the protective elements in the document; and
wherein the processor displays the verification on the display.

* * * * *